Figure 1:
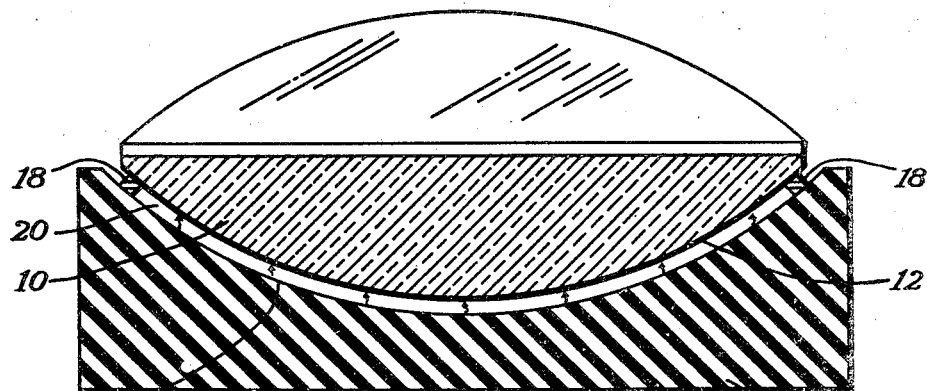

Aug. 26, 1947.   F. E. WILLIAMS   2,426,541
METHOD OF REDUCING REFLECTION FROM CURVED GLASS SURFACES
Filed April 28, 1944

INVENTOR.
Ferd Elton Williams
BY
ATTORNEY

Patented Aug. 26, 1947

2,426,541

UNITED STATES PATENT OFFICE 2,426,541

METHOD OF REDUCING REFLECTION FROM CURVED GLASS SURFACES

Ferd E. Williams, Princeton, N. J., assignor to Radio Corporation of America, a corporation of Delaware Application April 28, 1944, Serial No. 533,121

11 Claims. (Cl. 41—42)

This invention relates to glass exhibiting low reflectivity and particularly to a method of treating a curved glass surface to procure a uniform reduction in light from all points on such surface.

In the copending application of Frederick Hermes Nicoll, Serial No. 461,958, filed October 14, 1942, for an "Optical element," which has been assigned to the same assignee as the instant application, there is described a method of skeletonizing a surface layer of glass to reduce reflection from a surface of the glass by exposing that surface under controlled conditions to the vapor emanating from an aqueous solution of hydrofluoric acid. In the copending application of Frederick Hermes Nicoll and Ferd Elton Williams, Serial 488,938, filed May 28, 1943, for a "Low reflection element," which has also been assigned to the same assignee as the instant application, fluosilicic acid is substituted for the hydrofluoric acid of the former application. In the process of each application, the acid solution is contained in a wax-lined or enameled tray or container, and the glass to be treated is placed on top of the tray with the surface to be treated facing downwardly, so as to be exposed to the vapor emanating from the solution. When the glass surface to be treated is curved, the production of a skeletonized reflection-reducing layer of uniform depth presents a problem, because the surface of the solution from which the vapor emanates is a plane surface, and some portions of the glass surface will be nearer to the source of the vapor than others and will, therefore, be treated to a greater extent than the more distant portions.

An object of this invention is to provide an improved method for procuring a uniform reduction in reflection of light from a curved or otherwise irregular surface.

An additional object is to provide an improved solution which may be used as a source of skeletonizing reagent in the method here described.

A further object is to provide material which may be made to conform to the irregular surface to be treated, and which may also act as a carrier of the skeletonizing reagent.

These objects are achieved in accordance with the invention by forming a surface of certain plastic materials hereinafter described to conform in shape or contour to the irregular glass surface to be treated; procuring the skeletonizing reagent to be adsorbed on the surface so formed, or to be absorbed within the surface layers of the plastic material; and evaporating the reagent slowly and uniformly from the formed surface onto the surface to be treated until a desired reduction in reflection is procured.

In practicing the methods described in the two before-mentioned copending applications, it was found that at times an improved or otherwise different reflection-reducing layer was formed at the edges of the glass surface under treatment. Investigation showed that this might be due to vapor which had been adsorbed on the surface or absorbed within the surface layers of the lining of the tray containing the acid solution, and which had then been evaporated onto the glass. This phenomenon has formed the basis of the experiments upon which the present invention is founded.

Ceresine wax which had sometimes been used as the tray lining as before mentioned was found to give erratic results, and other materials are presently preferred for practicing the invention. The requirements for such a material are: (a) that it may be readily formed to conform to an irregular glass surface to be treated, (b) that it shall be capable of adsorbing the skeletonizing reagent on its formed surface, or of absorbing the reagent within its surface layers, and (c) that it shall not be deleteriously affected by chemical or other reaction with the skeletonizing reagent, at least during the period of treatment.

The last requirement was the most difficult to meet since hydrofluoric acid and fluosilicic acid (which dissociates into hydrofluoric acid and silicon tetrafluoride) attack most metals and metallic oxides, and many substances (for example, Celluloid and most carbonates) which might otherwise be considered as suitable sorbents.

Among the materials which fulfill the above requirements and which I prefer to use in practicing the invention (although my invention is not limited to these materials) are: (1) methyl methacrylate resin, particularly that form of it which is sold under the trade name of "Lucite," (2) polystyrene resin, and (3) the insulating enamel known as "Harvel," which is the reaction product of cashew nut shell oil and formaldehyde. This enamel is described in U. S. Patent 1,725,795. Such enamel, owing to its resistance to acids, is used for lining acid baths.

Figure 2:
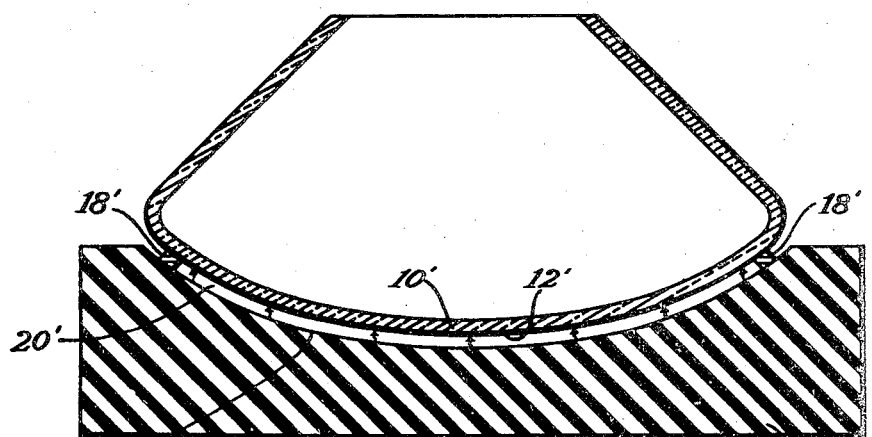

The invention may be better understood from a consideration of the following more detailed description thereof when read in conjunction with the accompanying drawing, in which:

Figure 1 is a view in section of an assembly suitable for treating the surface of a convex lens, and Figure 2 is a view similar to Figure 1, but wherein the element to be treated is the face of a cathode ray tube.

In Figure 1, there is seen an optical element 10, which may be a glass lens having a convex surface 12. If this were supported above a solution of hydrofluoric acid or fluosilicic acid, the protuberant central portion of the surface 12 would be exposed more extensively to the vapor emanating from the acid solution than the retracted end portions of such surface. To solve this problem, a piece of material 14, which may be one of the three preferred materials before mentioned or such other materials as satisfy the requirements before specified, is formed with a surface or face 16 which conforms to the shape of the lens surface 12. Thermoplastic materials like the methyl methacrylate and polystyrene resins may be readily molded, cast, bent or otherwise formed to any desired shape.

To procure a satisfactory concentration of hydrofluoric acid, I prefer to use for the skeletonizing solution a mixture of both hydrofluoric acid and fluosilicic acid. Aqueous solutions containing from 4 per cent to 16 per cent by weight of hydrofluoric acid and from 8 per cent to 16 per cent by weight of fluosilicic acid have given satisfactory results.

The acid mixture must then be adsorbed onto the formed surface 16 (or absorbed within the surface layers), and this may be done either by immersing the surface or face 16 of the material 14 in the acid solution or by so placing it in the path of vapor emanating from the solution that the mixture of the two acids is adsorbed onto the plastic surface, or absorbed within the surface layers of the plastic material. After an immersion period of approximately two hours, the surface becomes saturated with the acid solution or vapor under ordinary ambient conditions.

The plastic negative replica is then removed from the solution or vapor in which it has been immersed and, after being dried with a cloth, is brought almost into contact with the surface to be treated. One practical way in which I do this, as shown in the drawing, is to place scotch tape 18, which may have a thickness of .0075 inch, between the two surfaces at their respective edges. The whole of the glass surface is thus exposed to the impregnated plastic surface except for the small portion where the scotch tape is used as a separator. An air space 20 is thus left between the two surfaces. Under ordinary conditions of temperature and pressure, the adsorbed or absorbed reagent will then evaporate or emanate slowly from the plastic surface onto the glass surface, and in from two to three hours, a skeletonized reflection-reducing surface layer is formed on the glass.

The point at which to terminate the treatment (if minimum reflection for white light is desired) may readily be determined by the characteristic purple interference color produced by the treated surface and which is visible in reflected light. The skeletonized layer will then have an effective optical thickness of a quarter of the wave length of green light, which is the mid-point of the visible spectrum and which is, therefore, particularly useful in reducing the reflection of white light. However, treatment for different periods will result in layers of different thicknesses, whose reflection-reducing properties are at a maximum for different components of light. The theory of reflection-reducing layers is well known and need not be described here. Since the plastic and glass surfaces are of the same general shape, all points on the glass surface are substantially equidistant from corresponding points on the plastic surface and, therefore, the glass surface is treated uniformly over its entire area. Small variations in the distance between the glass and plastic surfaces do not affect the time of treatment appreciably.

Figure 2 illustrates the application of the method thus far described to an element whose surface is shaped differently from the convex lens of Figure 1. In this case, the element 10' is the face of a cathode ray tube, and its surface 12' is slightly curved in the center and more pronouncedly curved at its ends. The plastic surface 16' must then be so shaped as to conform as nearly as possible to the shape of the surface 12'.

Without wishing to limit myself to any specific theory, it is believed that the physical phenomenon which takes place when the formed plastic surface is immersed in the skeletonizing reagent is one of both absorption and adsorption. Physical adsorption can produce a film a few molecules thick at the most, and this would not provide sufficient reagent on the plastic surface to produce a quarter-wave thick film on the glass. The reaction which takes place is, therefore, referred to in the accompanying claims by the generic term of "sorption," to include both adsorption and absorption. Accordingly, where the term "surface" or "face" is used in the claims in connection with said plastic materials, it is intended to refer not merely to the geometric surface strictly so-called, but also to layers of the plastic material adjacent to the surface and within which the reagent may be absorbed.

While the method here described finds its greatest utility in the uniform treatment of irregular surfaces, it may also be used in the treatment of plane surfaces as an alternative to the method described and claimed in the two copending applications to which reference has been made.

There has thus been described a process for the uniform treatment of an irregular glass surface for reducing reflection of light uniformly from every point on such a surface. The process includes forming plastic material to conform to the shape of the surface to be treated, causing skeletonizing reagent to be adsorbed onto the plastic surface or otherwise retained thereon, bringing the plastic and glass surfaces almost into contact with each other, and causing the reagent to emanate or be evaporated slowly and uniformly onto the glass surface until a desired reduction in reflection is procured.

I claim as my invention:

1. In the method of treating curved glass procure a uniform reduction in the reflection light from a surface thereof, the steps which include bringing said glass surface and a curved sorbent surface of plastic material conforming shape to said glass surface into closely spaced relation with each other, said sorbent surface having sorbed therein a reagent which in a vaporous state is capable of skeletonizing a surface layer of the glass, and which emanates from sa sorbent surface onto said glass surface, and removing said glass after the vapor of said reagent has produced a reflection reducing film on the surface of said glass.

2. The method of treating glass with a reagent capable of skeletonizing a surface layer of the glass to procure a uniform reduction in reflection of light from a surface of the glass by the aid of a material which is capable of sorbing said reagent in a surface thereof and which is otherwise substantially unaffected by said reagent at least during the period of treatment, including the steps of (a) forming a surface of said material to conform in shape to said glass surface, (b) immersing said formed surface in said reagent to cause at least a portion of said reagent to be sorbed therein, (c) removing said formed surface from said reagent, (d) bringing said formed surface and said glass surface into closely spaced relation with each other, and (e) causing vapor from said sorbed reagent to emanate slowly from said formed surface onto said glass surface whereby said glass is skeletonized and reduction in reflection of light from said glass surface is procured.

3. The method of treating glass to procure a uniform reduction in the reflection of light from a surface thereof, including the step of exposing said surface to vapor of a fluid which skeletonizes the surface of said glass emanating from a surface of methyl methacrylate resin, said last-mentioned surface (a) being formed to conform in shape to said glass surface, (b) having sorbed therein a fluid capable of skeletonizing a surface layer of the glass, and (c) being in closely spaced relation with said glass surface.

4. The method of treating glass to procure a uniform reduction in the reflection of light from a surface thereof, including the step of exposing said surface to vapor of a fluid which skeletonizes the surface of said glass emanating from a surface of polystyrene resin, said last-mentioned surface (a) being formed to conform in shape to said glass surface, (b) having sorbed therein a fluid capable of skeletonizing a surface layer of the glass, and (c) being in closely spaced relation with said glass surface.

5. The method of treating glass to procure a uniform reduction in reflection of light from a surface thereof, including the steps of (a) forming a surface of material to conform in shape to said glass surface, said material being of such a character as to be capable of sorbing within said formed surface a solution containing a mixture of hydrofluoric and fluosilicic acids and to be otherwise substantially unaffected by said solution at least during the period of treatment, (b) immersing said formed surface in said solution to cause at least a portion of said solution to be sorbed thereby, (c) removing said formed surface from said solution, (d) bringing said formed surface and said glass surface into closely spaced relation with each other, and (e) causing vapors of said sorbed solution to emanate slowly from said formed surface onto said glass surface until a desired reduction in reflection of light from said glass surface is procured.

6. The method of treating glass to procure a uniform reduction in reflection of light from a surface thereof, including the steps of (a) forming a surface of material to conform in shape to said glass surface, said material being of such a character as to be capable of sorbing within said formed surface the acid solution hereinafter mentioned and to be otherwise substantially unaffected by said solution at least during the period of treatment, (b) immersing said formed surface in a solution containing between 4 per cent and 16 per cent by weight of hydrofluoric acid and btween 8 per cent and 16 per cent by weight of fluosilicic acid to cause at least a portion of said solution to be sorbed by said formed surface, (c) removing said formed surface from said solution, (d) bringing said formed surface and said glass surface into closely spaced relation with each other, and (e) causing said sorbed solution to emanate slowly from said formed surface onto said glass surface until a desired reduction in reflection of light from said glass surface is procured.

7. The method of treating glass to procure a uniform reduction in reflection of light from a surface thereof, including the steps of (a) forming a surface of material to conform in shape to said glass surface, said material being capable of sorbing within said formed surface a gaseous mixture of hydrofluoric and fluosilicic acids and to be otherwise substantially unaffected by said mixture at least during the period of treatment, (b) immersing said formed surface in said mixture to cause at least a portion of said mixture to be sorbed thereby, (c) removing said formed surface from said mixture, (d) bringing said formed surface and said glass surface into closely spaced relation with each other, and (e) causing said sorbed mixture to emanate slowly from said formed surface onto said glass surface until a desired reduction in reflection of light from said glass surface is procured.

8. The method of treating glass to procure a uniform reduction of light from a surface thereof including the steps of sorbing a fluid capable of skeletonizing a surface layer of said glass by a sorbent material having a face which conforms to the shape of said surface, removing excess fluid from the face of said material and exposing said glass to said face in uniformly closely spaced relation whereby vapor emanating from said face skeletonizes said surface.

9. The method of treating glass to procure a uniform reflection reducing surface which includes the steps of sorbing a fluid capable of skeletonizing the surface of said glass by a sorbent material which is not affected by said fluid and which has a face conforming to the shape of said surface, removing excess fluid from said face and exposing said surface to said face in uniformly closely spaced relation.

10. The method of treating the surface of a glass object to reduce its reflectance to light which includes the steps of shaping the surface of a sorbent material to conform to the contour of the surface of said glass, exposing the surface of said sorbent material to a reagent capable of producing a reflection-reducing film on the surface of said glass by means of vapors emitted by said reagent to cause said reagent to be sorbed by said material, bringing said glass into uniformly closely spaced relation to said material to subject it to the effect of said reagent, and removing said glass after a reflection-reducing interference film has been produced having a thickness equal to a quarter wavelength of visible light.

11. The method of treating glass to procure a uniform reduction in reflection of light from a surface thereof, the steps which include exposing to a reagent which in a vaporous state is capable of producing a reflection-reducing film on the surface of said glass a sorbent material having a surface conforming to the contour of said glass, bringing said glass into uniformly spaced relation to the surface of said material, and causing the vapor of said reagent to emanate from said material whereby said glass is subjected to the effect of said vapor and removing said glass after a reflection-reducing film has been produced thereon.

FERD E. WILLIAMS.

REFERENCES CITED

The following references are of record in the file of this patent:

UNITED STATES PATENTS

| Number | Name | Date |
|---|---|---|
| 2,220,862 | Blodgett | Nov. 5, 1940 |
| 2,286,819 | Lee | June 16, 1942 |

FOREIGN PATENTS

| Number | Country | Date |
|---|---|---|
| 364,878 | France | 1906 |

OTHER REFERENCES

New Method of Coating Lenses Results in Tough, Hard Film, F. H. Nicoll, International Projectionists, July 1942, page 9, copy 88-1 (Refl. & Refr.). (Div. 7, U. S. Patent Office.)